Patented Jan. 7, 1941

UNITED STATES PATENT OFFICE

2,227,963

AZO COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application July 25, 1939, Serial No. 286,402

9 Claims. (Cl. 260—205)

This invention relates to the preparation of azo dyes and to textile materials colored therewith. More particularly it relates to water-soluble azo compounds having the general formula:

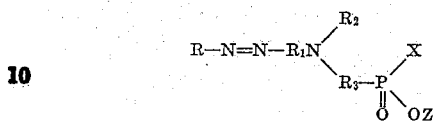

wherein R represents the residue of a member selected from the group consisting of a benzene nucleus, a naphthalene nucleus, and an azobenzene nucleus, $R_1$ represents the residue of a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acyloxy group, an alkylene group, a sulfoalkyl group, a sulfatoalkyl group, a cyclohexyl group, a tetra hydrofurfuryl group, a phosphoalkyl group, and a phenyl group, X represents hydrogen, and the group —OZ, $R_3$ represents a saturated aliphatic radical of at least two carbon atoms, and Z represents a member selected from the group consisting of hydrogen, a nitrogen base group, and an alkali forming metal.

It should be noted that while our invention is primarily concerned with the monoazo compounds, polyazo compounds are likewise included within the scope of the invention, as will be more fully apparent hereinafter. R in the above general formula, for example, may be an aromatic component containing an azo bond such as an azobenzene nucleus.

It is an object, therefore, of our invention to prepare the azo compounds above described and to color cellulose organic derivatives, silk and wool in the form of threads, yarns, filaments and fabric materials therewith.

The azo compounds of the invention may be prepared by coupling the diazo salts of various suitable aromatic amines with coupling components having the general formula:

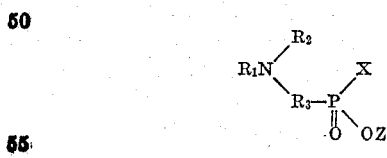

wherein $R_1$, $R_2$, $R_3$, X, and Z have the meanings already defined.

The above type of coupling intermediates may be obtained by a number of processes depending on the substituents desired. For example, for compounds where $R_3$ represents an alkylene group, aromatic amine compounds belonging to the benzene and naphthalene series and having free amino hydrogens are condensed with compounds of the type

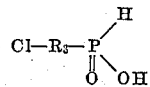

and

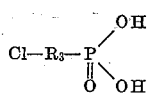

which latter may be obtained by the process described in U. S. Patent No. 2,137,792. In the case where $R_3$ represents an aliphatic group substituted by a hydroxyl group in alpha position to the phosphonic acid group, the starting material is a halogenated ketone belonging to the aliphatic series such as chloroacetone, which is reacted with phosphorus trichloride and then treated with glacial acetic acid to form the hydroxyphosphonic acid represented by the formula:

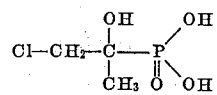

This compound is then condensed with amines of the benzene and naphthalene series in the presence of a suitable base to give the compounds illustrated by the following general formula:

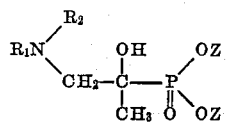

wherein $R_1$, $R_2$, and Z have the meanings previously defined. In place of chloroacetone there may be substituted chloroaldehydes belonging to the aliphatic series such as chloroacetaldehyde, and other halogenated ketones including compounds such as β-chloroethyl methyl ketone, β-chloroethyl ethyl ketone, γ-chloropropyl methylketone and the like. Furthermore, the hydroxyl group may be esterified with a fatty acid including among others acetic acid, propionic acid and butyric acid.

The following examples illustrate the preparation of the azo compounds of our invention.

*Example 1*

1 mole of p-aminoacetophenone is diazotized with sodium nitrite and stirred into an iced mineral acid solution of 1 mole of butyl-β-phosphoethyl aniline. The coupling reaction is completed by adding sodium acetate, after which mineral acid may be added in slight excess, if the free acid is desired. The dye is then salted out, filtered and dried. Cellulose acetate silk and wool are colored orange shades from its aqueous suspensions or solutions which may contain salt.

The azo compound obtained has the formula:

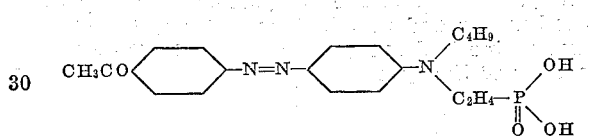

The above azo compound readily reacts to form salts with ammonium compounds, trimethylbenzyl ammonium hydroxide, mono-, di-, and triethanolamine, diethylcyclohexylamine, laurylamine, and with various compounds of sodium, potassium, calcium and the like.

*Example 2*

1 mole of p-nitro-o-bromoaniline is diazotized and coupled with 1 mole of 5-hydroxy-1-phosphopropylamino naphthalene following the procedure of Example 1. Cellulose acetate, silk and wool are colored blue shades from an aqueous suspension or solution of the dye.

The azo compound obtained has the formula:

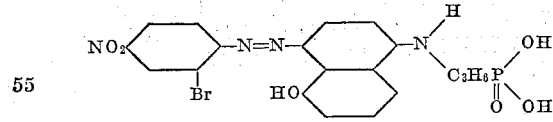

*Example 3*

1 mole of 2,4-dinitroaniline is diazotized and coupled with 1 mole of 2-methoxy-5-methyl-β-hydroxyethyl phosphinous ethylamino benzene following the procedure described in Example 1. The resulting dye colors cellulose acetate silk and wool violet shades when dyed from its aqueous solutions or suspensions.

The azo compound has the formula:

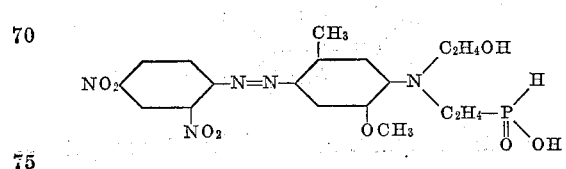

*Example 4*

1 mole of p-nitroaniline is diazotized and coupled with 1 mole of 1-phosphoethyl-2-dimethyl-4-methyl tetrahydroquinoline following the procedure described in Example 1. Cellulose acetate, silk and wool are colored magenta shades from aqueous suspensions of the dye.

The azo compound has the formula:

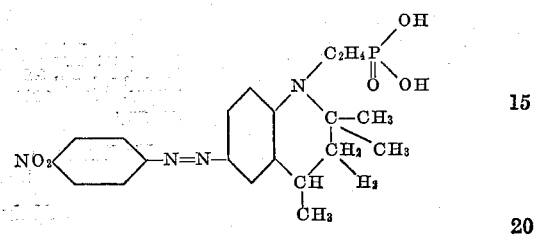

*Example 5*

1 mole of p-nitro-o-chloroaniline is diazotized and coupled with 1 mole of N-phosphoethoxy-ethyl-4-sulphonic-diphenylamine following the procedure of Example 1. Silk, wool, cotton and viscose are colored rubine shades from aqueous solutions which may contain salt.

The azo compound has the formula:

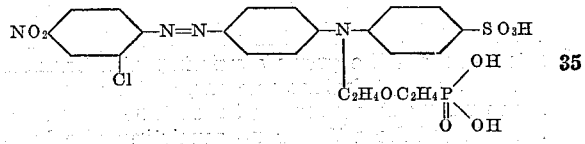

*Example 6*

1 mole of 2,4-dinitro-6-cyanoaniline is diazotized and coupled with 1 mole of 5-hydroxy-8-sulfonic acid-1-β-phosphinous acid ethylamino naphthalene following the procedure described in Example 1. Silk, wool, cotton and viscose are colored blue shades from aqueous solutions of the dye which may contain salt.

The azo compound obtained has the formula:

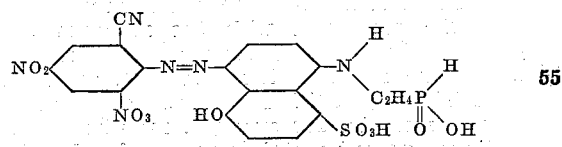

*Example 7*

1 mole of o-chloroaniline is dissolved in 1500 c. cs. of water containing 250 c. cs. of hydrochloric acid, ice added, and the mixture diazotized with 69 grams of sodium nitrite. 1 mole of the disodium salt of butyl-β,β-hydroxy phosphonic acid propylaminobenzene is dissolved in ice water and the diazo solution added with stirring. The coupling reaction is completed by adding sodium carbonate until the mixture is slightly alkaline to litmus indicator, after which the dye is salted out, filtered, washed and dried. Cellulose acetate, silk and wool are colored yellow shades from aqueous solutions of the dye which may contain salt.

The azo compound obtained has the formula:

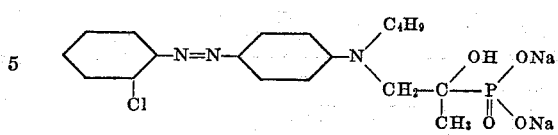

Example 8

1 mole of o-aminophenylmethylsulfone is diazotized and coupled with 1 mole of the sodium potassium salt of ethyl-$\beta,\beta$-acetoxy phosphonic acid-$\alpha$-butyl ethylaminobenzene following the procedure of Example 7. Cellulose acetate, silk and wool are colored yellow shades from aqueous solutions of the dye which may contain salt.

The azo compound has the formula:

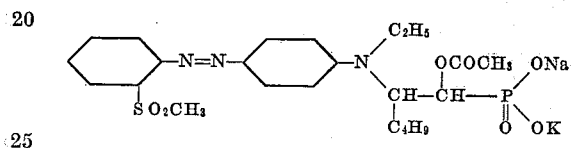

Example 9

1 mole of p-nitroaniline is diazotized and coupled with 1 mole of the di-diethylamine salt of ethyl-$\alpha$-methyl-$\beta,\beta$-hydroxyphosphonic acid butylaminobenzene following the procedure of Example 7. Cellulose acetate is colored red shades from aqueous solutions of the dye which may contain salt.

The azo compound obtained has the formula:

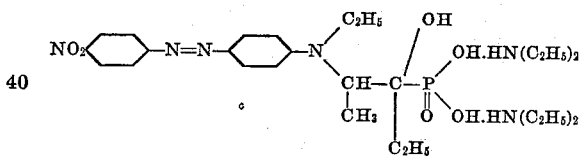

Example 10

(A) 1 mole of 2,4-dinitroaniline is dissolved in 2200 c. cs. of hot acetic acid and rapidly cooled to room temperature.

(B) 76 grams of sodium nitrite are dissolved in 500 c. cs. of sulphuric acid at 15–20° C., then heated to 70° C., and followed by cooling to 15–20° C.

Solution A is stirred into B over a period of 30 minutes, meanwhile maintaining the temperature at 15° C., then stirring is continued for another hour at room temperature, after which time 10 grams of urea are added.

The diazo solution thus prepared is coupled with 1 equivalent of the diammonium salt of 3-methyl-butyl-$\beta,\beta$-hydroxy phosphonic acid propylamino benzene in the manner described for coupling and recovering the dye in Example 7. The dye colors cellulose acetate, silk and wool violet shades from its aqueous solutions which may contain salt.

The azo compound obtained has the formula:

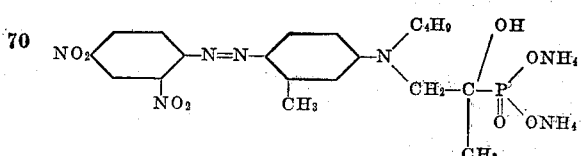

Example 11

The diazo solution of Example 10 is coupled with 1 mole of the diammonium salt of 1-butyl-$\beta,\beta$-hydroxy phosphonic acid propylamino-5-naphthol following the procedure of Example 10. Cellulose acetate, silk and wool are colored blue from aqueous solutions of the dye which may contain salt.

The azo compound has the formula:

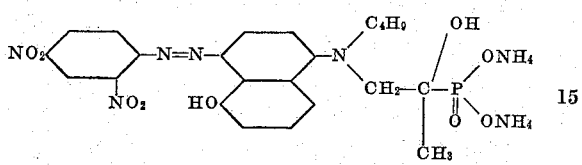

Example 12

1 mole of 2,4-dinitro-6-bromoaniline is diazotized and coupled with 1 mole of the diammonium salt of 1-$\gamma,\gamma$-hydroxy-phosphonic acid heptylamino-5-naphthol in the manner described in Example 10. Cellulose acetate, silk and wool are colored blue-green shades from aqueous solutions of the dye which may contain salt.

The azo compound thus obtained has the formula:

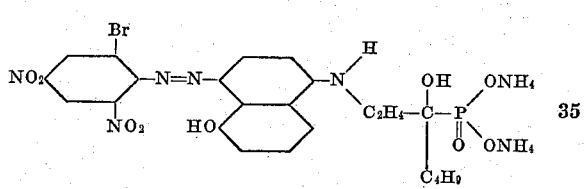

Another process of preparing the azo compounds of our invention employs as the starting material an azo compound having an alkyl ketoalkylamino group which can be converted over to the desired hydroxy phosphonic acid derivative by reaction with a phosphorus chloride as illustrated in the following example.

Example 13

1 mole of 4-(4'-nitro-2',5'-dichlorophenylazo-)-3-methylethyl acetoethylaminobenzene is allowed to stand with approximately 1.1 moles of phosphorus trichloride at room temperature for several days, at the end of which time there is added 500 c. cs. of acetic acid. After standing for three more days water is added, and the dye obtained by crystallization. Cellulose acetate, silk and wool are colored rubine shades from its aqueous suspensions which may contain salt.

The azo compound obtained has the formula:

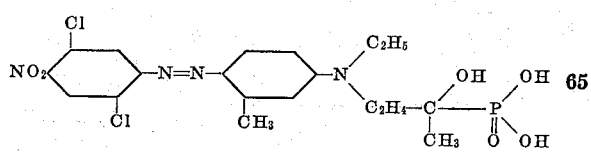

The azo compounds of our invention are illustrated further by the following table wherein the compound appearing under "Amine" is diazotized and coupled with the specified "Coupling component" to yield azo compounds which impart to textile fibers the shades of color designated.

Table

| Amine | Coupling component | Shade on textile fibers |
|---|---|---|
| p-Nitroaniline | Phosphobutylaniline | Orange. |
| Do | 3-methoxy-di-β-phosphoethylaniline | Magenta. |
| Do | 3-methyl-β-disodium phosphoethylmethylaniline | Red. |
| p-Nitro-o-chloro-aniline | 3-chloro-ω-phospho-n-hexylaminobenzene | Orange. |
| p-Nitro-o-fluoro-aniline | 2,5-dimethoxy-β-sulphoethyl-ω-phosphinous hexylaminobenzene. | Rubine. |
| 5-nitro-2-aminobenzene sulfonic acid | 2-methoxy-5-acetamino-ethyl-ω-phospho-n-butyl aminobenzene. | Greenish-blue. |
| 2,4-dinitro-6-chloro-aniline | α-ω-phospho-n-pentyl naphthylamine | Reddish-blue. |
| 2,4-dinitro-6-bromo-aniline | 7-methyl-3-hydroxy-N-phosphoethyl tetra-hydroquinoline. | Blue. |
| 2,4-dinitro-6-sulfon-ethylamide aniline | 2-ethoxy-5-sulphoacet-amino-β-methoxyethyl-β-phosphoethyl amino-benzene. | Do. |
| 2-amino-3,5-dinitro benzoic acid | 5-hydroxy-8-sulphonic acid-1-phosphoethyl amino naphthalene. | Do. |
| 2,4-dinitro-6-cyano-aniline | 2-methoxy-5-acetamino-ω-phospho-n-propyl amino-benzene. | Do. |
| 2-amino-3,5-dinitro phenylmethylsulfone | β-sulfatoethyl phosphoethyl cresidine | Reddish-blue. |
| 2-amino-3,5-dinitro benzene sulfonic acid | 1-phosphoethylamino-5-naphthol | Blue. |
| 1-amino-5-naphthol-8-sulfonic acid | | |
| Methyl anthranilate | [structure: N-pentyl anilino-CH(CH₃)-CH-P(OH)(O)(ONH₄)₂] | Yellow. |
| p-Aminoacetophenone | [structure: 4-CH₃-C₆H₄-NH-CH(C₃H₇)-C(OH)(CH₃)-P(O)(ONH₄)₂] | Orange. |
| 5-nitro-2-aminophenyl-methyl ketone | [structure: 2-Cl-C₆H₄-N(CH₂-CH(OH)-P(O)(ONa)₂)₂] | Red. |
| 2-methoxy-4-nitro-aniline | [structure: 2-OCH₃-C₆H₄-N(C₆H₁₁)-CH₂-C(OH)(C₂H₅)-P(O)(OK)₂] | Do. |
| p-Nitro-o-chloroaniline | [structure: 2-OCH₃,5-CH₃-C₆H₃-N(C₄H₉)-CH-C(OH)(CH₃)-P(O)(ONH₄)₂] | Rubine. |
| 2-amino-3,5-dinitro-6-benzene sulfonethylamide | [structure: 2,5-(OCH₃)₂-C₆H₃-N(C₂H₄SO₃Na)-CH(CH₃)-C(OH)(CH₃)-P(O)(ONa)₂] | Red-blue. |
| p-Nitro-o-bromoaniline | [structure: 2,5-(OC₂H₅)₂-C₆H₃-N(C₃H₇)-CH₂-C(OH)(CH₃)-P(O)(ONH₄)₂] | Wine. |
| p-Aminoazobenzene | [structure: C₆H₅-N(cyclohexyl)-CH₂-C(OH)(CH₃)-P(O)(ONH₄)₂] | Orange. |
| 2,4-dinitroaniline | [structure: 2-OCH₃,5-NHCOCH₃-C₆H₃-N(C₄H₉)-CH(C₃H₇)-C(OH)(CH₃)-P(O)(ONa)₂] | Blue. |
| 2,4-dinitro-6-chloro-aniline | [structure: 2-OCH₃,5-NHCOC₃H₇-C₆H₃-N(C₂H₄OH)-CH₂-C(OH)(CH₃)-P(O)(ONH₄)₂] | Greenish-blue. |

In place of the diazotization components specified in the preceding examples, there may be substituted p-nitro-o-methyl aniline, 4-nitro-2-cyanoaniline, 5 - nitro-2-aminophenylmethyl sulfone, 1-amino-5-naphthol, 1-amino-2,4-dinitro-5-naphthol, 2,4-dinitro-α-naphthylamine, dianisidines, benzidines, aminobenzothiazole, 4-(4'-nitro-2'-hydroxy-azo-)-3-methyl aniline and other similar kind of diazotizable aromatic amines.

In place of the coupling components specified in the preceding examples, there may be substituted the following compounds:

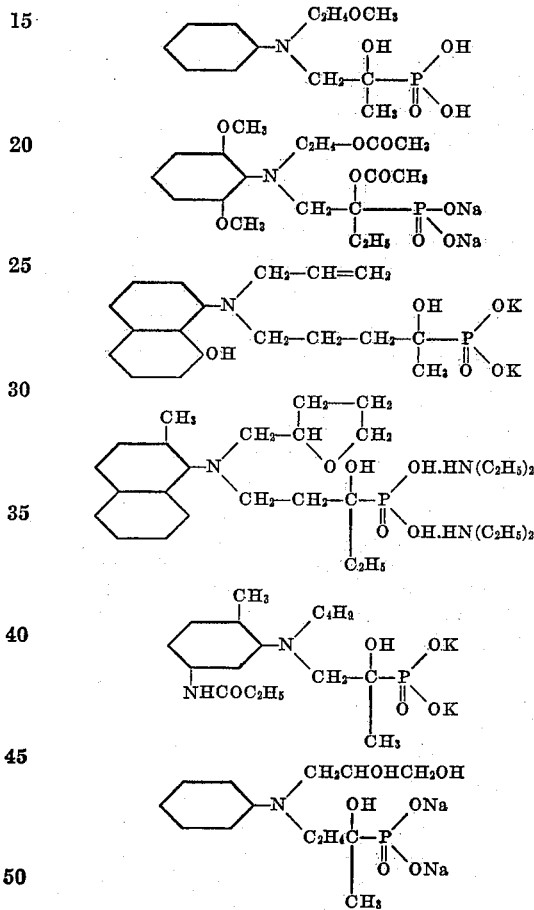

and

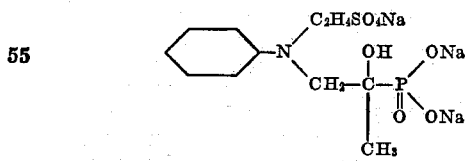

The azo dyes of our invention being water-soluble they may be used for the direct coloration of organic derivatives of cellulose, silk and wool in the form of threads, yarns, filaments and fabric materials without the necessity of using a dispersing or solubilizing agent. The dyeing operation will be conducted in accordance with the usual dyeing practice, salt being added if desired to facilitate exhaustion of the dye bath. For a more detailed description as to how the water-soluble azo dyes of our invention may be employed for the coloration of textile materials, reference may be had to our U. S. Patent No. 2,107,898 issued February 8, 1938.

The term "organic derivatives of cellulose" is intended to include the hydrolyzed as well as the unhydrolyzed cellulose organic acid esters and cellulose mixed organic acid esters such as cellulose acetate, cellulose formate, cellulose propionate, cellulose butyrate, cellulose acetate-propionate, cellulose acetate-butyrate, and cellulose ethers such as methyl cellulose, ethyl cellulose, and benzyl cellulose.

The expression "phospho" as used throughout the specification and claims unless otherwise specified is intended to mean the free acid

and the salts of the acid.

We claim:

1. The azo compounds having the general formula:

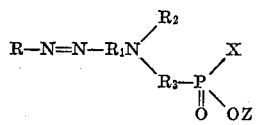

wherein R represents a member selected from the group consisting of a benzene nucleus, a naphthalene nucleus, and an azobenzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, $R_3$ represents a saturated aliphatic group containing at least two carbon atoms, X represents a member selected from the group consisting of hydrogen, and the group —OZ, Z represents a member selected from the group consisting of hydrogen, a nitrogen base group, and an alkali forming metal, and wherein the group

is joined to N through a carbon linkage of $R_3$.

2. The azo compounds having the general formula:

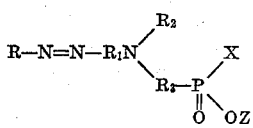

wherein R represents a benzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, $R_3$ represents a saturated aliphatic group containing at least two carbon atoms, X represents a member selected from the group consisting of hydrogen, and the group —OZ, Z represents a member selected from the group consisting of hydrogen, a nitrogen base group, and an alkali forming metal, and wherein the group

is joined to N through a carbon linkage of R₃.

3. The azo compounds having the general formula:

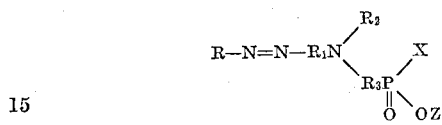

wherein R and R₁ each represents a benzene nucleus, R₂ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, R₃ represents a saturated aliphatic group containing at least two carbon atoms, X represents a member selected from the group consisting of hydrogen, and the group —OZ, Z represents a member selected from the group consisting of hydrogen, a nitrogen base group, and an alkali forming metal, and wherein the group

is joined to N through a carbon linkage of R₃.

4. The azo compounds having the general formula:

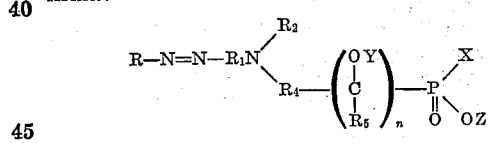

wherein R represents a member selected from the group consisting of a benzene nucleus, a naphthalene nucleus, and an azobenzene nucleus, R₁ represents a member selected from the group consisting of a benzene nucleus, and a naphthalene nucleus, R₂ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, R₄ represents a saturated aliphatic hydrocarbon group, R₅ represents a member selected from the group consisting of hydrogen, and an alkyl group, Y represents a member selected from the group consisting of hydrogen, and an acyl group, n represents zero, and the numeral 1, X represents a member selected from the group consisting of hydrogen, and the group —OZ, each Z represents a member selected from the group consisting of hydrogen, a nitrogen base group, and an alkali forming metal, and wherein the group

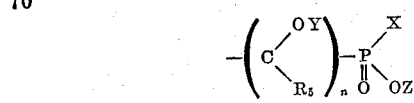

is joined to N through a carbon linkage of R₄.

5. The azo compounds having the general formula:

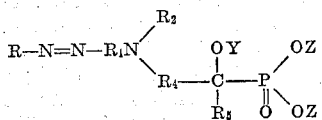

wherein R represents a member selected from the group consisting of a benzene nucleus, a naphthalene nucleus, and an azobenzene nucleus, R₁ represents a member selected from the group consisting of a benzene nucleus, and a naphthalene nucleus, R₂ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, R₄ represents a saturated aliphatic hydrocarbon group, R₅ represents a member selected from the group consisting of hydrogen, and an alkyl group, Y represents a member selected from the group consisting of hydrogen, and an acyl group, each Z represents a member selected from the group consisting of hydrogen, a nitrogen base group, and an alkali forming metal, and wherein the group

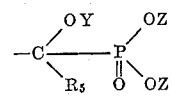

is joined to N through a carbon linkage of R₄.

6. Material made of or containing an organic derivative of cellulose colored with a dye selected from the class of azo compounds having the general formula:

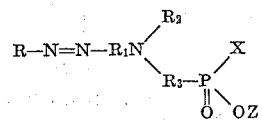

wherein R represents a member selected from the group consisting of a benzene nucleus, a naphthalene nucleus, and an azobenzene nucleus, R₁ represents a member selected from the group consisting of a benzene nucleus, and a naphthalene nucleus, R₂ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, R₃ represents a saturated aliphatic group containing at least two carbon atoms, X represents a member selected from the group consisting of hydrogen, and the group —OZ, Z represents a member selected from the group consisting of hydrogen, a nitrogen base group, and an alkali forming metal, and wherein the group

is joined to N through a carbon linkage of R₃.

7. Material made of or containing cellulose acetate colored with a dye selected from the class of azo compounds having the general formula:

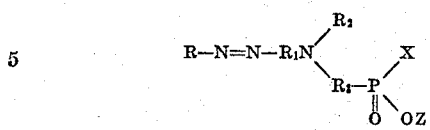

wherein R represents a member selected from the group consisting of a benzene nucleus, a naphthalene nucleus, and an azobenzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, $R_3$ represents a saturated aliphatic group containing at least two carbon atoms, X represents a member selected from the group consisting of hydrogen, and the group —OZ, Z represents a member selected from the group consisting of hydrogen, a nitrogen base group, and an alkali forming metal, and wherein the group

is joined to N through a carbon linkage of $R_3$.

8. Material made of or containing organic derivatives of cellulose colored with a dye selected from the class of azo compounds having the general formula:

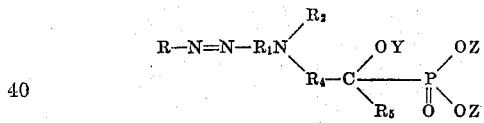

where R represents a member selected from the group consisting of a benzene nucleus, a naphthalene nucleus, and an azobenzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, $R_4$ represents a saturated aliphatic hydrocarbon group, $R_5$ represents a member selected from the group consisting of hydrogen, and an alkyl group, Y represents a member selected from the group consisting of hydrogen, and an acyl group, each Z represents a member selected from the group consisting of hydrogen, a nitrogen base group, and an alkali forming metal, and wherein the group

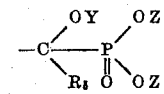

is joined to N through a carbon linkage of $R_4$.

9. Material made of or containing cellulose acetate colored with a dye selected from the class of azo compounds having the general formula:

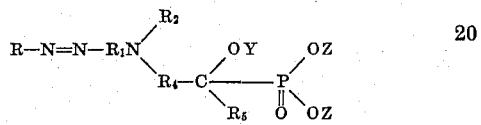

wherein R represents a member selected from the group consisting of a benzene nucleus, a naphthalene nucleus, and an azobenzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, an alkoxyalkyl group, an acetoxyalkyl group, an alkylene group, a sulfoalkyl group, a sulfatoalkyl group, a cycloalkyl group, a tetrahydrofurfuryl group, a phosphoalkyl group, and a phenyl group, $R_4$ represents a saturated aliphatic hydrocarbon group, $R_5$ represents a member selected from the group consisting of hydrogen, and an alkyl group, Y represents a member selected from the group consisting of hydrogen, and an acyl group, each Z represents a member selected from the group consisting of hydrogen, a nitrogen base group, and an alkali forming metal, and wherein the group

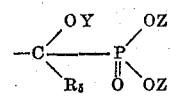

is joined to N through a carbon linkage of $R_4$.

JOSEPH B. DICKEY.
JAMES G. McNALLY.

Certificate of Correction

Patent No. 2,227,963. January 7, 1941.

JOSEPH B. DICKEY ET AL.

It is hereby certified that error appears in the printed specification of the above numbered patent requiring correction as follows: Page 2, second column, lines 10 to 20 inclusive, Example 4, for that portion of the formula reading

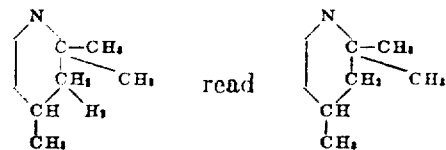

and that the said Letters Patent should be read with this correction therein that the same may conform to the record of the case in the Patent Office.

Signed and sealed this 1st day of April, A. D. 1941.

[SEAL]

HENRY VAN ARSDALE,
*Acting Commissioner of Patents.*